United States Patent [19]

Chang

[11] Patent Number: 4,830,078
[45] Date of Patent: May 16, 1989

[54] HELICAL CABLE TIRE CHAIN HAVING MULTI-ANGULAR TRACTION SLEEVES AND RUBBER RINGS

[76] Inventor: Keun I. Chang, 147 Wonseo-Dong, Jongro-Ku, Seoul, Rep. of Korea

[21] Appl. No.: 124,610

[22] Filed: Nov. 24, 1987

[30] Foreign Application Priority Data

Nov. 9, 1987 [KR] Rep. of Korea ............ 87-19330

[51] Int. Cl.⁴ .............. B60C 27/06; B60C 27/20
[52] U.S. Cl. .................... 152/222; 152/231; 152/243
[58] Field of Search ............ 152/213 A, 222, 223, 152/243, 187, 221

[56] References Cited

U.S. PATENT DOCUMENTS

| | | | |
|---|---|---|---|
| 2,728,371 | 12/1955 | McCarthy | 152/243 X |
| 3,871,720 | 3/1975 | Mosshart et al. | 152/187 X |
| 4,155,389 | 5/1979 | Dwinell | 152/221 |
| 4,275,781 | 6/1981 | Riedel | 152/223 X |

Primary Examiner—Michael W. Ball
Assistant Examiner—Gregory Wilber
Attorney, Agent, or Firm—Birch, Stewart, Kolasch & Birch

[57] ABSTRACT

A helical cable tire chain having a series of small multi-angular metal traction sleeves, a series of rubber rings, which are supported on a helical cable when it is attached to a tire so that the chain enhances the traction and gripping power on ice or snow.

2 Claims, 1 Drawing Sheet

HELICAL CABLE TIRE CHAIN HAVING MULTI-ANGULAR TRACTION SLEEVES AND RUBBER RINGS

BACKGROUND OF THE INVENTION

1. Field of the Invention

The present invention relates to safety cable tire chains for automobiles, and particularly to chains for automobile tires having helical cable cross members extending through multi-angular traction sleeves and rubber rings disposed between the sleeves.

2. Description of the Prior Art

Some tire chains have been previously available comprised of cross members which are applied to tires mounted on a vehicle wheel and formed of a cable or a wire rope and having cylindrical metal traction sleeves supported on the cable or the wire rope as exemplified by U.S. Pat. Nos. 1,890,957 to Squier, 2,341,131 to Ederer, 2,514,243 to Iandiorio, 2,714,914 to Champigny, 2,767,760 to Granger, 2,791,257 to Jacobson et al., 4,155,389 to Dwinell, 4,280,545 to Martinelli, 4,263,954 to Dwinell, and 4,321,956 to Martinell. However, none of these provide tire chains which are attached to tires in a ladder-shaped configuration, having multi-angular metal sleeves and rubber rings disposed between the sleeves, which are supported on a cable for improving the traction capability of the tire on ice or snow.

SUMMARY OF THE INVENTION

Accordingly, it is therefore an object of the present invention to provide a helical cable tire chain having multi-angular traction sleeves and rubber rings.

Another object of the present invention is to provide a tire chain having cross members which have a series of multi-angular metal traction sleeves and a series of rubber rings disposed between the sleeves, which are supported on the cable wherein the diameter of the rubber ring is larger than the diagonal line of the angular metal traction sleeve.

It is a further object of the present invention to provide a tire chain which is applied to a tire in a ladder-shaped configuration.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention comprises a tire chain of multiple cable cross members having a series of small multi-angular metal traction sleeves and a series of rubber rings disposed between the sleeves, which are supported on a helical metal cable for tightening the tire chain to the tire and improving the traction capability of the tire on ice or snow. The tire chain is attached to the tire in ladder-shaped configuration.

BRIEF DESCRIPTION OF THE DRAWING

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
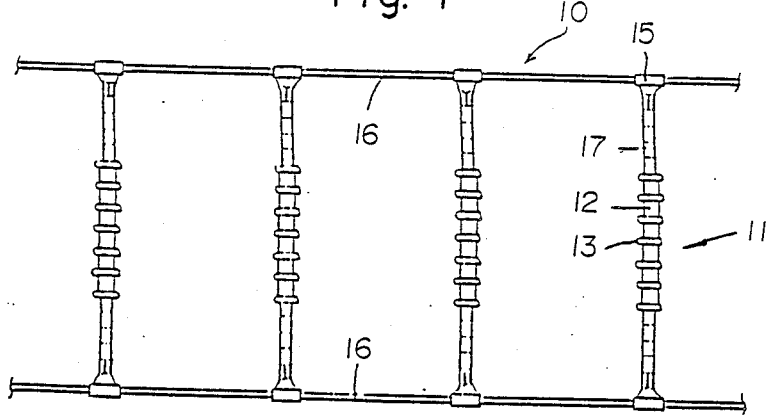
FIG. 1 is a top plan view of the tire chain of the present invention showing the chain applied as a ladder-shaped configuration.
Figure 2:
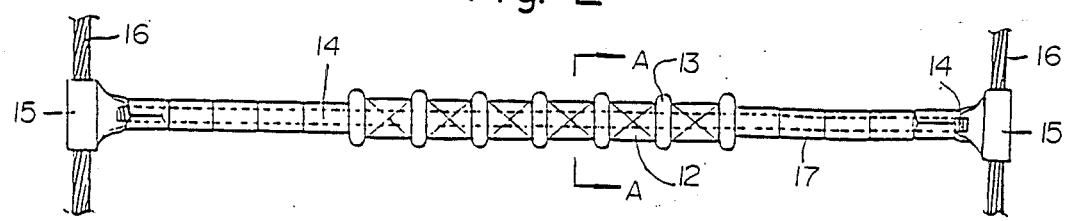
FIG. 2 is an enlarged top plan view of the tire chain of the present invention showing the chain provided with both end connecting members for mounting to both wire ropes.

Referring now to the drawing, for the purpose of illustrating preferred embodiments of the present invention, the cable tire chain 10 of the present invention, as shown in FIGS. 1 and 2, comprises a plurality of cross members 11 having a series of small multi-angular metal traction sleeves 12, a series of large hard rubber rings 13 disposed between the sleeves 13, which are supported on a helical metal cable 14, and connecting members 15 such as a hook which connects the cable 14 with a wire rope 16.

Figure 3:
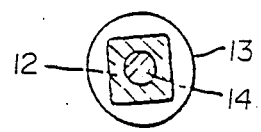
FIG. 3 is a cross-sectional view of FIG. 2, taken along line A—A, showing a configuration of the metal traction sleeve of the present invention having a rectangular shape.

The cross member 11, as shown in FIGS. 2 and 3 comprises the helical metal cable 14, multi-angular sleeves, such as rectangular metal traction sleeves 12, and rubber rings 13 disposed between the sleeves 12, which are supported on the helical metal cable 14 so that a plurality of these multi-angular sleeves 12 and rubber rings 13 functions for tightening the tire chain 10 to the tire on snow or ice, improving the traction capability of the tire, and gripping power for the tire. A few cylindrical sleeves 17 may be provided on both sides of the cable 14 for maintaining a space between the composite of multi-angular sleeves 12 and rubber ring 13, and the connecting member 15. The cross member 11 forms a certain angle with the wire rope 16 at the connecting member 15. The diameter of the rings 13 is larger than the multi-angular metal traction sleeve 12 so that its surface extends beyond that of the traction sleeve 12 for contacting the surface of the ground. Thus, since the cross member 11 contains, in turn, the series of small multi-angular sleeves 12 and large hard rubber rings 13, the cross member 11 forms a convex and concave configuration to be adapted to operatively receive the tire. Furthermore, the tire chain 10 having a plurality of cross members 11 with the hard rubber rings 13 has many advantages, for example, the tire chain 10 can protect the surface of road from the metal traction sleeves 12 thereof and can improve the tractive force thereof against on ice or snow.

In defining the operation of the present invention, although components are not shown in drawing, a user places a linking portion on the outside of the tire with the longer section directed to the center of the automobile and fastening a linking hook to the tire by inserting it through a slotted hole. Then the longer part of the tire chain 10 of the present invention is stretched toward and lifted so as to be wrapped over the tire. The end fastening members can then easily be attached to a linking notch by the linking hook. The tire chain 10 can be easily removed from the tire in reverse fashion.

The helical cable tire chain 10 having the multi-angular traction sleeves 12 and the rubber rings 13 of the present invention has a strong tractive force and gripping power, and reduces the vibration of the automobile because the tire chains 10 are helical or ladder-shaped.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A helical cable automobile tire chain to be attached to a tire used in snow or ice which comprises:
   a plurality of cross members, each of said cross members including
      a series of rectangular metal traction sleeves,
      a series of rubber rings disposed between said metal traction sleeves, the diameter of each of said rubber rings being larger than each of said metal traction sleeves so that the surface extends beyond that of said metal traction sleeve for contacting the surface of the ground,
      a helical metal cable supporting said metal traction sleeves and said rubber rings,
      a pair of connecting members attached to both ends of said helical metal cable, and
      a series of cylindrical sleeves provided on both sides of said helical metal cable for maintaining a space between the composite of said metal traction sleeves and said rubber rings, and
   a pair of wire ropes connected to said plurality of cross members through said connecting members, whereby the cross members form a continuous pattern across the tire surface for improving the traction capability of the tire and gripping power for the tire on ice and snow.

2. The helical cable automobile tire chain of claim 1, wherein the rubber ring is made of a hard rubber material.

* * * * *